United States Patent Office 3,072,685
Patented Jan. 8, 1963

3,072,685
11α-SULFONYLOXY-RING A-BROMINATED STEROIDS AND PROCESS FOR THEIR MANUFACTURE
Albert Wettstein, Riehen, and Karl Heusler and Peter Wieland, Basel, Switzerland, assignors to Ciba Corporation, a corporation of Delaware
No Drawing. Filed Dec. 23, 1959, Ser. No. 861,448
Claims priority, application Switzerland Dec. 24, 1958
15 Claims. (Cl. 260—397.3)

The present invention provides a process for the manufacture of 3-keto-9:11-dehydrosteroids, containing at least one double bond in ring A, from saturated 3-keto-11α-hydroxysteroids. The $\Delta^{4:9(11)}$-3-keto-steroid dienes and $\Delta^{1:4:9(11)}$-3-keto-steroid trienes obtained by the present process are valuable intermediates for use in the manufacture of the highly active $\Delta^{4}$- and $\Delta^{1:4}$-11-oxygenated 9α-halogeno-3-keto-steriods such, for example, as 11β-hydroxy-9α-fluoro-methyltestosterone, 1-dehydro-11β-hydroxy-9α-fluoro-methyltestosterone, 9α-fluoro-hydrocortisone, 9α-fluoro-prednisolone, 9α-fluoro-16-methyl-hydrocortisone, 9α-fluoro-16-methyl-prednisolone and the like.

The 3-keto-9:11-dehydro-steroids unsaturated in ring A have hitherto been manufactured as a rule by elimination of an 11-hydroxyl group—prior or subsequent to the introduction of one or two double bonds into the ring A—with formation of a 9:11-double bond. This procedure has various disadvantages in that, with certain reagents for splitting off the hydroxyl group (for example phosphorus oxychloride or thionyl chloride and pyridine) unsatisfactory yields of the dehydrated compounds are obtained when the ring A contains double bonds. Besides, the presence of a double bond in the 9:11-position renders the introduction of one or two double bonds into ring A by bromination and dehydrobromination, more difficult especially in the 5α-series.

The present process for the manufacture of 3-keto-9:11-dehydro-derivatives unsaturated in ring A not only overcomes the afore-mentioned difficulties but is in addition extremely simple to perform on an industrial scale and requires fewer reaction stages than the previously known processes. According to this new process an 11α-sulfonyloxy-3-ketosteroid saturated in ring A is brominated in the known manner and the resulting bromo ketone, after having rearranged any 2:2-dibromide obtained to a 2:4-dibromide, is heated in a dialkyl formamide with a lithium halide, if desired in the presence of an alkali metal carbonate, and if desired a resulting product containing halogen is dehalogenated by reduction. By the treatment with lithium halide and the dialkyl formamide sulfonic acid corresponding to the sulfonyl group present and hydrobromic acid are eliminated with formation of the 9,11- and 4,5 or 4,5 and 1,2-double bonds.

The bromination of the 11α-sulfonyloxy-3-ketosteroid used as starting material is carried out in a manner analogous to the known bromination of 3-ketones that are saturated in ring A and do not contain such a group in the 11-position. It is of advantage to use a solvent that is inert towards bromine and in which anhydrous hydrohalic acids are readily soluble, for example a halogenated hydrocarbon such as chloroform, or a lower fatty acid such as acetic acid or an ether, especially a cyclic ether, e.g. dioxane. When one molecular equivalent of bromine is used, compounds of the 5β-series (with cis-linkage of the rings A and B) readily yield 4-monobromides; on the other hand a compound of the 5α-series yields with 2 molecular equivalents of bromine at first a 2:2-dibromide which under the action of acid is subsequently converted into a 2:4-dibromide. For the manufacture of these compounds it is of advantage to add an anhydrous hydrohalic acid, such as hydrobromic acid, before proceeding to the bromination.

A solvent particularly suitable for the elimination of the hydrogen halide and of the sulfonic acid is dimethyl formamide which is at the same time a good solvent for the lithium halides, more especially lithium chloride or lithium bromide. For the neutralization of the acids formed during the elimination it is of advantage to add a neutralizing agent, for example an alkali metal acylate such as potassium acetate or lithium acetate, or preferably an alkali metal carbonate such as lithium carbonate, potassium carbonate or sodium carbonate. The 11α-sulfonyloxy-bromo ketone is heated for 2 to 20 hours at a temperature ranging from 80 to 150° C., depending on the reactivity of the group or groups to be eliminated.

Surprisingly, it has been observed that especially in the case of 2:4-dibromides of 11α-sulfonic acid esters of the allo-(5α)-series, the elimination of the sulfonic acid ester group and of the bromine atom in the 4-position takes place even under relatively mild conditions, for example at a reaction temperature below 100° C., whereas for the preparation of $\Delta^{1:4:9(11)}$-trienes the temperature is raised. The ready elimination of the 4-bromine atom is all the more unexpected, since it was known that in the case of steroids saturated in the 9-position the bromine atom in the 2-position is first eliminated with lithium carbonate in dimethyl-formamide. An extremely simple way of obtaining $\Delta^{4:9(11)}$-dienes from the 11α-sulfonic acid esters of 3-ketones of the allo-(5α)-series is made possible by the ready elimination of the 4-bromine atom in the 2:4-dibromides obtained by the present process. This method consists in heating the 2:4-dibromides, obtained after bromination and rearrangement, at a low temperature, preferably between 70 and 120° C., with a lithium halide in the presence of an alkali metal carbonate in a dialkyl formamide and dehalogenating the resulting halogenous product by reduction. This process is considerably simpler than previously known processes for the preparation of $\Delta^{4:9(11)}$-dienes from 11-oxygenated 3-ketones of the allo-(5α)-series in which bromination first had to be carried out, then rearrangement to form the 2:4-dibromide, then a reaction with potassium iodide to form the $\Delta^{4}$-2-iodo-3-ketone, then de-iodation and finally elimination of the 11-hydroxyl group.

For dehalogenation by reduction the methods known for this reaction are used, for example reduction with zinc in the presence of an alcohol or a weak acid, for example glacial acetic acid, if desired with the addition of a diluent, such as dioxane, or of chromous salts, for example in acetic acid solution.

The 11α-sulfonyloxy-steroids saturated in ring A, used as starting materials, belong to the cholestane, stigmastane, spirostane, cholane, eticholane or preferably to the androstane or pregnane series. They are obtained by esterification of the appropriate 11α-hydroxy compounds with reactive derivatives of sulfonic acid, especially of methane-sulfonic, benzene sulfonic, para-toluenesulfonic acid or the like. Particularly valuable starting materials are 11α-sulfonyl esters of 11α:17β-dihydroxy-5β-androstane-3-one, 11α:17β-dihydroxy-5α-androstane-3-one, 11α-hydroxy-5α-androstane-3:17-dione, 11α:17α - dihydroxy-21-acyloxy 5α- and 5β-pregnane-3:20-dione as well as 11α:17α-dihydroxy-16-alkyl- (more especially 16α-methyl)-21-acyloxy-5α and 5β-pregnane-3:20 dione. A particularly advantageous method for the manufacture of these 16α-methyl compounds has been described in co-pending patent application No. 824,210, filed July 1, 1959, by Albert Wettstein et al. The other, as yet unknown, 11α-hydroxy-3-ketones can be prepared in a simple manner from the appropriate 11-ketones by protecting the reactive keto groups in positions 3 and/or 20 by a known ketalization operation and then reducing the 11-keto group with the aid of sodium and propanol, or of lithium in liquid ammonia.

The conversion of the 9:11-dehydrosteroids unsaturated in ring A, obtained by the present process, into the corresponding 11β-hydroxy-9α-fluoro compounds is known; it is carried out by additive combination with hydrobromous acid, followed by alkaline treatment and opening up of the 9:11β-epoxide formed with the aid of hydrofluoric acid.

The following examples illustrate the invention.

*Example 1*

A solution of 2.10 grams of pure 11α:17α-dihydroxy-16α-methyl-21-acetoxy-allopregnane-3:20-dione in 16 cc. of methylene chloride and 40 cc. of pyridine is treated with 1.0 cc. of distilled methanesulfonyl chloride and the reaction mixture is kept overnight at 0° C., then diluted with 80 cc. of methylene chloride, and the solution is repeatedly washed with ice-cold N-hydrochloric acid and with water. The aqueous solutions are extracted with methylene chloride, and the extracts are combined and evaporated to dryness in a water-jet vacuum, to yield 2.97 grams of 11α-mesyloxy-17α-hydroxy-16α-methyl-21-acetoxy-allopregnane-3:20 dione in the form of a colorless foam.

This crude mesylate is dissolved in 25 cc. of glacial acetic acid and mixed with 2.4 cc. of a 4.2 N-solution of hydrogen bromide in glacial acetic acid. In the course of 10 minutes at an internal temperature of 15 to 16° C. 6.45 cc. of a 3.31 N-solution of bromine in glacial acetic acid is then stirred in. The whole is kept for 10 minutes at 20 to 23° C., poured into 200 cc. of water and extracted 3 times with 80 cc. of methylene chloride. The organic solutions are washed with 350 cc. of saturated sodium bicarbonate solution and 200 cc. of water, dried and evaporated in a water-jet vacuum at a bath temperature of 30° C. The foam obtained in this manner is dissolved in 15 cc. dimethyl formamide and added to a mixture (previously heated with stirring at 95–97° C. under nitrogen) of 3 grams of lithium bromide, 3 grams of lithium carbonate and 45 cc. of dimethyl formamide. The whole is then stirred for 15 hours at an internal temperature of 95 to 97° C. in a weak current of nitrogen, allowed to cool, poured into 75 cc. of water and extracted three times with 150 cc. of methylene chloride. The organic solutions are washed 3 times with 75 cc. of water, dried and evaporated in a water-jet vacuum. The residue is dissolved in xylene, the solution is evaporated in a water-jet vacuum, and this operation is repeated once with xylene and once with benzene. The product is then chromatographed on 100 grams of silica gel containing 15% of water. The subsequent fractions eluted with a benzene+ethyl acetate mixture 9:1 yield 370 mg. of $\Delta^{1:4:9(11)}$-16α-methyl-17α-hydroxy-21-acetoxy-pregnatriene-3:20-dione which on being recrystallized melts at 211–213° C.

*Example 2*

A solution of 1.0 gram of 11α:17α-dihydroxy-16α-methyl-21-acetoxy-allopregnane-3:20-dione in 8.0 cc. of methylene chloride and 2.0 cc. of pyridine is treated with 900 mg. of para-toluenesulfonyl chloride, and the mixture is kept for 20 hours at room temperature, then diluted with methylene chloride, repeatedly washed with N-hydrochloric acid and with water, and the organic solutions are dried and evaporated in a water-jet vacuum. Crystallization of the residue from methylene chloride+ether yields 1.10 grams of 11α-tosyloxy-17α-hydroxy-16α-methyl-21-acetoxy-allopregnane-3:20-dione melting at 145–147° C. (with decomposition).

1.3 cc. of a 3.24 N-solution of bromine in glacial acetic acid is stirred dropwise at an internal temperature of 16° C. into a solution of 575 mg. of 11α-tosyloxy-16α-methyl-17α-hydroxy-21-acetoxy-allopregnane-3:20-dione in 3 cc. of methylene chloride, 7 cc. of glacial acetic acid and 0.45 cc. of a 4.47 N-solution of hydrogen bromide in glacial acetic acid. The whole is kept for 10 minutes at 20 to 23° C. and then poured into 30 cc. of water and extracted 3 times with 20 cc. of methylene chloride. The organic solutions are washed once with 60 cc. of saturated sodium bicarbonate solution and once with 30 cc. of water, dried and evaporated in a water-jet vacuum at a bath temperature of 30° C. The residue is taken up in 5 cc. of dimethyl formamide and added to a mixture (previously heated with stirring for 1 hour at 95–97° C. under nitrogen) of 1 gram of lithium bromide, 1 gram of lithium carbonate and 15 cc. of dimethyl formamide. The whole is heated with stirring for 15 hours at 95–97° C. under nitrogen and then poured into 50 cc. of water and 1.6 cc. of glacial acetic acid, and extracted 3 times with 50 cc. of methylene chloride. The organic solutions are then washed twice with 50 cc. of water, dried, evaporated in a water-jet vacuum, and the residue is dissolved in xylene, this solution is evaporated in a water-jet vacuum, and this operation is repeated once with xylene and twice with benzene. The residue is chromatographed on 25 grams of silica gel (containing 15% of water), and the fractions eluted with a 9:1 mixture of benzene+ethyl acetate yield 120 mg. of $\Delta^{1:4:9(11)}$-16α-methyl-17α-hydroxy-21-acetoxy-pregnatriene-3:20-dione described in Example 1.

Analogous bromination of the known 11α-tosyloxy-17α-methyl-17β-hydroxy-5β-androstane-3-one with 1.05 mols of bromine and splitting off with lithium chloride-lithium carbonate in dimethyl formamide yields 9:11-dehydro-17α-methyltestosterone melting at 163–165° C.

When brominated with 2.1 mols of bromine and subjected to splitting off as described above, 11α-tosyloxy-17α-methyl-17β-hydroxy-5α-androstane-3-one yields $\Delta^{1:4:9(11)}$-17α-methyl-17β-hydroxy-androstatriene-3-one.

*Example 3*

1.3 cc. of a 3.24 N-solution of bromine in glacial acetic acid are added dropwise with stirring and at an internal temperature of 16° C. to a solution of 575 mg. of 11α-tosyloxy-16α-methyl-17α-hydroxy-21-acetoxy-allopregnane-3:20-dione in 3 cc. of methylene chloride, 7 cc. of glacial acetic acid and 0.45 cc. of a 4.47 N hydrobromic acid solution in glacial acetic acid. After being allowed to stand for 10 minutes at 20–23° C., the whole is poured on to 30 cc. of water and extracted three times with 20 cc. of methylene chloride. The organic solutions are washed once with 60 cc. of saturated sodium bicarbonate solution and once with 30 cc. of water, dried and evaporated in a water-jet vacuum at a bath temperature of 30° C. The residue with 5 cc. of dimethyl formamide is then added to a mixture of 1 gram of lithium carbonate, 1 gram of lithium bromide and 15 cc. of dimethyl formamide previously heated to 95–97° C. for one hour, with stirring, in a current of nitrogen. After heating the mixture for 15 hours at 95–97° C. with stirring in a current of nitrogen, it is poured on to 50 cc. of water and 1.6 cc. of glacial acetic acid and extracted three times with 50 cc. of methylene chloride. The organic solutions are then washed twice with 50 cc. of water, dried, evaporated in a water jet vacuum, dissolved in xylene, evaporated in a water jet vacuum again, and this operation is repeated once with xylene and twice with benzene. The residue is chromatographed on 25 grams of silica gel containing 15% of water, a halogenous compound melting at 216–217° C. being isolated from the fractions eluted with a mixture of benzene and ethyl acetate (19:1). In the ultraviolet spectrum (solvent: rectified spirit) the product exhibits a maximum at 241 mμ, and in the infrared spectrum (solvent: methylene chloride) inter alia bands at 2.78μ, 5.71μ, 5.77μ, 5.91μ, 6.17μ and 8.14μ. The fractions eluted with a mixture of benzene and ethyl acetate (9:1) yield the $\Delta^{1:4:9(11)}$-16α-methyl-17α-hydroxy-21-acetoxy-pregnatriene-3:20-dione described in Example 1.

To a solution of 150 mg. of the above described halogenous compound in 10 cc. of glacial acetic acid there are added 1.5 grams of zinc dust and 5 cc. of glacial acetic acid, and the whole is stirred for 20 minutes in a bath of 70° C. The mixture is then cooled in ice-water, the zinc dust filtered off, the filtrate being allowed to flow into a flask containing 200 mg. of sodium acetate. After washing the zinc dust with a mixture of glacial acetic acid and benzene, the filtrate is concentrated to 10 cc. in a water-jet vacuum, 30 cc. of water are added, and extraction carried out three times with 40 cc. of methylene chloride. The methylene chloride extracts are washed with water, saturated sodium bicarbonate solution and water, then dried and evaporated in a water-jet vacuum. After recrystallizing the residue from a mixture of methylene chloride and ether, $\Delta^{4:9(11)}$-16α-methyl-17α-hydroxy-21-acetoxy-pregnadiene-3:20-dione melting at 205.5–207.5° C. is obtained. In the ultraviolet spectrum (solvent: methanol) the product shows a maximum at 240 mµ and in the infrared spectrum (solvent: methylene chloride) bands at 2.76µ (hydroxyl); 5.70µ (acetate); 5.75µ (20-ketone); 5.95µ+6.16µ ($\Delta^4$-3-ketone) and 8.13µ (acetate). Optical rotation $[\alpha]_D^{26} = +93°$ (c.=1.089 in chloroform).

*Example 4*

3.16 cc. of a 3.23 N-solution of bromine in glacial acetic acid are added dropwise with stirring in the course of 10 minutes and at an internal temperature of 16° C. to a solution of 1.38 grams of 11α-tosyloxy-16α-methyl-17α-hydroxy-acetoxy-allopregnane-3:20-dione in 7.2 cc. of methylene chloride, 16.8 cc. of glacial acetic acid and 1.08 cc. of a 4.47 N-hydrobromic acid solution in glacial acetic acid. After being allowed to stand for 10 minutes at 20° C. the whole is worked up in the way described in Example 3. The residue is dissolved in 12 cc. of dimethyl formamide and added to a mixture of 2.4 grams of lithium carbonate, 24 cc. of a 10% solution of lithium chloride in dimethyl formamide and 12 cc. of dimethyl formamide, and the whole is stirred for 15 hours in a current of nitrogen at an internal temperature of 95–97° C. The reaction mixture is worked up as described in Example 3, and the residue chromatographed on 60 grams of silica gel containing 15% of water. From the fractions eluted with a mixture of benzene and ethyl acetate (19:1) a product is obtained which as regards melting point, mixed melting point and infrared spectrum is identical with the halogenous compound described in Example 3 which, on being subsequently treated with zinc dust, passes over to form the $\Delta^{4:9(11)}$-16α-methyl-17α-hydroxy-21-acetoxy-pregnadiene-3:20-dione described in Example 3.

*Example 5*

Crude 11α-mesyloxy-17α-hydroxy-16α-methyl-21-acetoxy-allopregnane-3:20-dione obtained from 2.10 grams of pure 11α:17α-dihydroxy-16α-methyl-21-acetoxy-allopregnane-3:20-dione by the procedure described in Example 1 is dissolved in 25 cc. of glacial acetic acid and 2.4 cc. of 4.2 N-hydrobromic acid in glacial acetic acid are added. 6.45 cc. of a 3.31 N-bromine solution in glacial acetic acid are then added in the course of 10 minutes with stirring and at an internal temperature of 15–16° C. After being allowed to stand for 10 minutes at 20–23° C., the whole is poured on to 200 cc. of water and extracted three times with 80 cc. of methylene chloride. The organic solutions are washed with 350 cc. of saturated sodium bicarbonate solution and 200 cc. of water, dried and evaporated at a bath temperature of 30° C. in a water-jet vacuum. The resulting foam dissolved in 15 cc. of dimethyl formamide is added to a mixture of 3 grams of lithium bromide, 3 grams of lithium carbonate and 45 cc. of dimethyl formamide previously heated to 95–97° C. with stirring in a current of nitrogen. The whole is then stirred for 15 hours at an internal temperature of 95–97° C. in a weak current of nitrogen, is poured, after cooling, on to 75 cc. of water and extracted three times with 150 cc. of methylene chloride. The organic solutions are washed three times with 75 cc. of water, dried and evaporated in a water-jet vacuum. The residue is dissolved in xylene, evaporated in a water-jet vacuum, and this operation is repeated once with xylene and once with benzene. Chromatography is then carried out on 100 grams of silica gel containing 15% of water, the halogenous compound described in Example 3 and, subsequently, $\Delta^{1:4:9(11)}$-16α-methyl-17α-hydroxy-21-acetoxy-pregnatriene-3:20-dione being eluted.

A mixture of 280 mg. of the above halogenous compound, 4.2 cc. of dioxane, 3 grams of zinc dust and 18 cc. of alcohol is boiled under reflux for 3 hours and then allowed to stand for 14 hours at room temperature. The mixture is then filtered, rinsed well with benzene and the filtrate extracted twice with water. The aqueous extracts are extracted once more with benzene, the organic solutions then dried and evaporated under reduced pressure. By recrystallizing the residue from a mixture of methylene chloride and ether there is obtained the $\Delta^{4:9(11)}$-16α-methyl-17α-hydroxy-21-acetoxy-pregnadiene-3:20-dione melting at 205.5–207° C. described in Example 3.

*Example 6*

0.45 cc. of a 4.47 N-hydrobromic acid solution in glacial acetic acid is added to a solution of 458 mg. of 11α-tosyloxy-androstane-3:17-dione in a mixture of 4 cc. of methylene chloride and 6 cc. of glacial acetic acid. 1.3 cc. of a 3.24 N-bromine solution in glacial acetic acid are then added dropwise at 17° C. with stirring. After the addition is complete, the whole is allowed to stand for 10 minutes at 20–25° C., poured on to 30 cc. of water and extracted several times with methylene chloride. The extracts are washed with saturated sodium bicarbonate solution and washed with water, dried and evaporated in a water-jet vacuum. The residue is heated with lithium bromide and lithium carbonate in dimethyl formamide as described in Example 3 and then worked up. The resulting crude product is chromatographed on 25 grams of silica gel containing 15% of water, a halogenous product being eluted already with benzene.

The halogenous compound is dissolved in a mixture of 4 cc. of dioxane and 16 cc. of alcohol, 3 grams of zinc dust are added and the reaction mixture boiled under reflux for 3 hours. The zinc is filtered off, the filtrate diluted with benzene and washed several times with water. The aqueous solutions are again extracted with benzene and the dried extracts evaporated under reduced pressure. From the residue there is obtained by crystallization from a mixture of methylene chloride and ether $\Delta^{4:9(11)}$-androstadiene-3:17-dione melting at 202–204° C.; optical rotation $[\alpha]_D^{23} = +221°$ (in chloroform).

The conversion of this compound via a 3-enamine, reaction with methyl magnesium iodide and enamine cleavage to form 9:11-dehydro-methyl-testosterone and subsequent conversion into the highly active 9α-fluoro-11β-hydroxy-methyl-testosterone is known.

The 11α-tosyloxy-androstane-3:17-dione used as starting material can be prepared as follows:

A solution of 1.0 gram of N-bromacetamide in 10 cc. of water is added to a solution of 1.4 grams of 3β:11α-dihydroxy-androstane-17-one which has been cooled to 0° C., and the whole is allowed to stand for 4 hours at 0° C. A solution of 2.0 grams of sodium sulfite in 20 cc. of water is then added and extraction carried out several times with methylene chloride. The extracts are washed with dilute thiosulfate solution and water, dried and evaporated. By crystallizing the residue from a mixture of methylene chloride and ether 940 mg. of 11α-hydroxy-androstane-3:17-dione melting at 178–180° C. are obtained; optical rotation $[\alpha]_D^{24} = +66.6°$ C.

A solution of 912 mg. of the above 11α-hydroxy-compound in 8 cc. of methylene chloride and 2 cc. of pyridine is mixed with 900 mg. of para-toluene-sulfo acid chloride and the whole allowed to stand at room temperature for 26 hours. It is then diluted with methylene chloride, washed with dilute hydrochloric acid and with water, the aqueous solutions extracted several times with methylene chloride and the dried extracts evaporated. The residue is filtered through 60 grams of silica gel, the excess toluene sulfo-chloride being first eluted with benzene and then 11α-tosyloxy-androstane-3:17-dione with a mixture of benzene and ethyl acetate, the product being precipitated in the form of crystals from ether and melting at 137—139° C.; optical rotation $[\alpha]_D^{24.8} = +29.1°$ (in chloroform).

What is claimed is:

1. Process for the manufacture of 3-keto-9:11-dehydro-steroids unsaturated in ring A, wherein an 11α-sulfonyloxy-3-keto-steroid saturated in ring A is brominated in known manner and the resulting bromo ketone, after having rearranged any 2:2-dibromide obtained to a 2:4-dibromide, is heated in a dialkyl formamide with a lithium halide, in the presence of an alkali metal carbonate.

2. Process for the manufacture of 3-keto-9:11-dehydro-steroids unsaturated in ring A, wherein an 11α-sulfonyloxy-3-keto-steroid saturated in ring A is brominated in known manner and the resulting bromo ketone, after having rearranged any 2:2-dibromide obtained to a 2:4-dibromide, is heated in a dialkyl formamide with a lithium halide, in the presence of an alkali metal carbonate and a resulting halogenous product is dehalogenated by reduction.

3. Process as claimed in claim 1, wherein heating is carried out with lithium bromide in dimethyl formamide.

4. Process as claimed in claim 1, wherein heating is carried out in the presence of lithium carbonate.

5. Process as claimed in claim 1, wherein an 11α-sulfonyloxy-3-keto-steroid of the 5α-series saturated in the ring A is brominated in known manner with at least 2 mols of bromide, the resulting 2:2-dibromide rearranged to form a 2:4-di-bromide, the latter heated to a temperature below 120° C. with a lithium halide in the presence of an alkali metal carbonate in a dialkyl formamide, and the resulting halogenous $\Delta^{4:9(11)}$-diene dehalogenated by reduction.

6. 11α-tosyloxy-2:4-dibromo-androstane-3:17-dione.

7. 11α-mesyloxy-2:4-dibromo - 17α - hydroxy-21-acetoxy-16α-methyl-allopregnane-3:20-dione.

8. 11α-tosyloxy-2:4-dibromo - 17α - hydroxy-21-acetoxy-16α-methyl-allopregnane-3:20-dione.

9. 11α:17β-dihydroxy-17α-methyl-androstane-3-one.

10. 11α-tosyloxy-androstane-3:17-dione.

11. A member selected from the group consisting of an 11α-sulfonyloxy-3,17-dioxo-4-bromo-androstane, 11α-sulfonyloxy-3-oxo-17β-hydroxy-4-bromo-androstane, 11α-sulfonyloxy-3-oxo-17α-methyl - 17β - hydroxy-4-bromo-androstane, the 5β-isomers thereof, the sulfonyloxy group being derived from an acid selected from the group consisting of a lower aliphatic sulfonic acid and a monocyclic aromatic sulfonic acid.

12. A member selected from the group consisting of an 11α-sulfonyloxy-3,20-dioxo-4-bromo - 17α - hydroxy-21-lower alkyl-carbonyloxy-pregnane, its 16α-methylated derivative, and the 5-allo-isomers of these compounds, the sulfonyloxy group being derived from an acid selected from the group consisting of a lower aliphatic sulfonic acid and a monocyclic aromatic sulfonic acid.

13. A member selected from the group consisting of an 11α-sulfonyloxy-3,17-dioxo-2,4-dibromo-androstane, 11α-sulfonyloxy-3-oxo-17β-hydroxy-2,4-dibromo - androstane, 11α-sulfonyloxy-3-oxo-17α-methyl - 17β - hydroxy-2,4-dibromo-androstane, the 5β-isomers thereof, the sulfonyloxy group being derived from an acid selected from the group consisting of a lower aliphatic sulfonic acid and a monocyclic aromatic sulfonic acid.

14. A member selected from the group consisting of an 11α-sulfonyloxy-3,20-dioxo-2,4-dibromo - 17α - hydroxy-21-lower alkyl-carbonyloxy-pregnane, its 16α-methylated derivative, and the 5-allo-isomers of these compounds, the sulfonyloxy group being derived from an acid selected from the group consisting of a lower aliphatic sulfonic acid and a monocyclic aromatic sulfonic acid.

15. Androstane compounds of the formula:

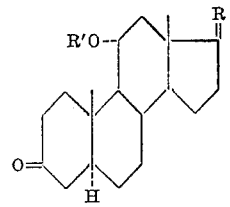

in which R stands for a member selected from the group consisting of an oxo group and a 17α-methyl group together with a free β-hydroxy group and R' for a member selected from the group consisting of a hydrogen atom and an acyl group derived from acids selected from the group consisting of a lower aliphatic sulfonic acid and a monocyclic aromatic sulfonic acid.

References Cited in the file of this patent

UNITED STATES PATENTS 2,666,016    Hechter et al. _____ Jan. 12, 1954

UNITED STATES PATENT OFFICE
CERTIFICATE OF CORRECTION

Patent No. 3,072,685

January 8, 1963

Albert Wettstein et al.

It is hereby certified that error appears in the above numbered patent requiring correction and that the said Letters Patent should read as corrected below.

Column 7, line 31, for "bromide" read -- bromine --.

Signed and sealed this 5th day of May 1964.

(SEAL)
Attest:

ERNEST W. SWIDER
Attesting Officer

EDWARD J. BRENNER
Commissioner of Patents